Patented Feb. 23, 1943

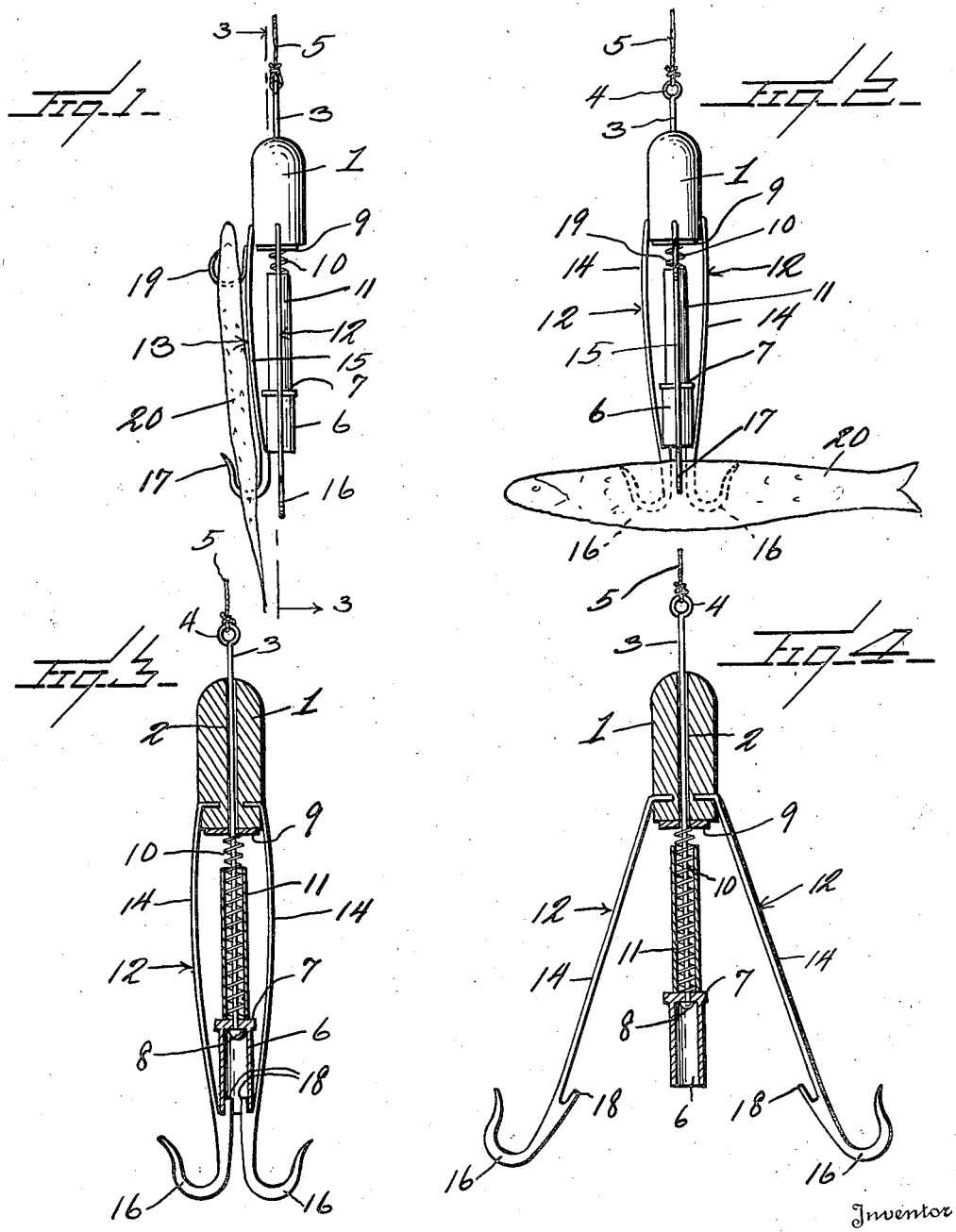

2,311,832

UNITED STATES PATENT OFFICE 2,311,832

FISHING HOOK

John Helfenstein, Bismarck, N. Dak., assignor of two-fifths to George M. Register, Bismarck, N. Dak.

Application December 8, 1941, Serial No. 422,145

8 Claims. (Cl. 43—36)

This invention relates generally to the class of fishing and trapping and pertains particularly to improvements in fishing hooks.

The primary object of the present invention is to provide an improved multiple or gang hook in which the several hooks are carried upon resilient shanks and are adapted to be held in a group in such a manner that when a fish strikes or takes the device in its mouth the group of hooks will be released so that the points or tines will be rapidly spread apart or thrown outwardly to positively engage in the tissues or bone of the mouth of the fish and insure the catching of the same.

Another object of the invention is to provide a multiple or gang fish hook in which the individual hooks are held together under tension in a group to be rapidly or violently thrown outwardly when one of the hooks is taken in the mouth of a fish and in which the holding means for the several hooks is so constructed and arranged that the device may be cast or used in trolling without danger of releasing the hooks prematurely.

Another object of the invention is to provide a gang hook of the character stated in which a novel means is provided for attaching a live bait, such as a minnow, or a pork rind, in either of two positions for casting and trolling or for still fishing so that in either of the two positions the live bait will assume a natural position in the water.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a view in elevation of the gang hook embodying the present invention the same being shown set and with a minnow attached in position for casting or trolling.

Figure 2 is a view in elevation of the set gang hook structure showing a live bait attached in a position for still fishing.

Figure 3 is a sectional view taken upon the line 3—3 of Figure 1.

Figure 4 is a sectional view substantially corresponding to Figure 3 but showing the hooks released and spread apart.

Referring now more particularly to the drawing it will be seen that the hook device embodying the present invention comprises a body portion 1 which is here shown as being relatively long and of circular cross-section and which has a longitudinal passage formed centrally therethrough, as indicated at 2.

Extending through the passage 2 of the body is a shaft 3 upon the outer end of which is formed an eye 4 for the attachment of a fishing line 5.

At the inner end or forward end of the shaft 3 there is located a short cylindrical keeper unit 6 which has a head 7 covering or closing one end and provided with a suitable central aperture through which the shaft 3 extends. The shaft upon the forward end is provided with a head 8 which is located within the cylinder and engages against the head 7 of the cylinder thus coupling the shaft and the cylinder in axial alinement. The opposite or forward end of the cylinder is open, as shown.

At the forward end of the body 1 is a washer or plate 9 through the center of which the shaft 3 passes and encircling the shaft 3 between this plate 9 and the head 7 of the cylinder is a compression spring 10.

Encircling the spring 10 is the relatively long sleeve 11. This sleeve is only slightly shorter than the spring 10 so that when opposing pulls are applied to the body 1 and the shaft 3 so as to pull the cylinder 6 rearwardly, the spring 10 will be put under compression or tension but the sleeve 11 will limit such tension or will limit the extent of backward movement of the cylinder 6 toward the body.

The body 1 has secured thereto a series of hooks, here shown as three in number, and two of these hooks are indicated by the reference character 12 while the third is generally indicated by the reference character 13. The shanks 14 for the hooks 12 are of slightly greater length than the shank 15 for the hook 13 and these shanks are each secured at one end in the body 1 and are equidistantly spaced around the body. At the forward or outer end of each shank 14 is a hook 16 while at the outer end of the shank 15 is a similar hook 17. As is clearly shown in Figures 1 and 2, the hooks 16 are located at the same distance from the body 1 whereas the hook 17 is slightly nearer to the body. However, the shanks 14 and 15 of the three hooks carry upon their inner sides just inwardly of the hook elements, spurs 18 which are all located the same distance from the forward end of the body 1 and which extend rearwardly and are adapted to be engaged in the forward open end of the cylinder 6. The length of the spring 10 is such that when the spurs are engaged in the forward end of the cylinder it will maintain the cylinder in position to hold the several hooks together in a group and in order that the spurs may be released the cylinder 6 and body 1 will have to be moved together so as to place the spring under tension. The shanks 14 and 15 of the several hooks are of spring material and they constantly tend to assume a straight condition as shown in Figure 4. Consequently when the hooks are pulled together into a group so that the spurs may be engaged in the forward end of the cylinder 6, the shanks of the several hook units are bent or placed under tension. Thus it will be seen that as soon as the cylinder 6 is shifted rearwardly with respect to the body 1 and with respect to the hooks which are attached to the body, the hooks will be released and the tensioned shanks will spring outwardly so as to forcibly separate the hooks and if this occurs after a fish has taken the group of hooks in its mouth it will be readily seen that the device cannot be removed from the fish's mouth and any attempt to draw it out will merely result in forcing the points of the hooks into the flesh of the fish.

The shorter shank 15 is provided with an auxiliary hook 19 adjacent its attached end. This auxiliary hook is employed for securing a minnow 20 or other bait such as a pork rind or the like longitudinally of the device when it is desired to use the same for casting or trolling. Thus it will be seen that the minnow when drawn through the water will be in a natural or life like position. If, however, it is desired to use the device in still fishing then the minnow is disposed transversely of the device and is secured at a suitable point between its head and tail upon the hook 17 which is located inwardly with respect to the hooks 16 in this manner the body of the minnow will cover the hooks 16 so that from one side of the device these hooks cannot be seen. This arrangement is shown in Figure 2.

From the foregoing it will be readily apparent that the device here described is so constructed that it may be cast or used for trolling without danger of releasing the hooks before the desired time while at the same time it will be apparent that when a pull is applied to the hooks in opposition to a pull upon the line 5 the body 1 and cylinder 6 will be drawn together against the tension of the spring 10 so that the spurs 18 will be disengaged and hooks will fly outwardly to secure the fish in the manner stated.

What is claimed is:

1. A gang fishing hook of the character described comprising a body, a plurality of hooks each having a relatively long shank, said hook shanks being secured to and around said body to extend in one direction therefrom and laterally with respect thereto, an element carried by the body and having limited free movement with respect thereto, longitudinally of the hooks and in the space defined by the hooks around the axis of the body, and a cooperating means between said element and the adjacent inner sides of the hooks for releasably holding the hooks in a closely related group and with said shanks flexed and under tension.

2. A fishing device as set forth in claim 1 in which said element comprises a rod loosely extended through the body and having the hooks and shanks disposed therearound, and the said means comprises a spur integral with each hook upon the inner side thereof and an element carried by the rod for detachable engagement with each spur upon the arrangement of the hooks in a close group and movement of the rod forwardly with respect to the body.

3. A fishing device of the character stated comprising an elongated body portion having an axial passage therethrough, a rod extending through said passage and formed at one end to facilitate attachment of a fishing line thereto, the other and forward end of the rod carrying a circular body, a plurality of fishing hooks each having a relatively long resilient shank, said hook shank being secured to and around the body and extending forwardly and laterally therefrom, and means for facilitating the detachable engagement of the hooks with said circular body when the hooks are drawn in into a group toward the axial center of the body and against the tension of the shanks.

4. A fishing device as set forth in claim 3 in which said circular body is in the form of a cylinder open at its forward end and said detachable securing means comprises a spur upon the inner side of each hook and directed toward the body.

5. A fishing device as set forth in claim 3 in which said circular body is of hollow form and said securing means comprises a spur upon the inner side of each hook and directed toward the body to engage within the hollow body, and a spring surrounding said rod and interposed between the hollow body and the first body and normally maintaining the hollow body in a position for engagement with said spurs to hold the hooks in a closely related group in which the shanks are under tension.

6. A fishing device of the character stated comprising a relatively long body portion having an axial passage therethrough, a rod extending through said passage for free movement therein and having means at one end for the attachment of a line thereto, the opposite and forward end of the rod having an axially extending cylindrical body open at its forward end, a plurality of hooks each having a spring metal shank, said hooks being grouped around the body and the shanks attached thereto for extension forward and laterally therefrom, a spur upon the inner side of each hook and directed toward the body and adapted to engage in the open end of the cylinder when the latter is moved to a predetermined position forwardly from the body, a spring member encircling the rod and maintaining the cylinder body in said predetermined position, and a sleeve encircling the spring and having a length materially less than the length of the spring when fully expanded, to limit the rearward movement of the cylinder body with respect to the first body.

7. A fishing device as set forth in claim 6 in which one of said hook shanks is of slightly less length than the other shanks, and an auxiliary hook carried by said one hook shank adjacent to the first body.

8. A gang fishing hook, comprising an elongated member, a body slidable on the member, a plurality of hooks having resilient shanks attached to the body and grouped around said member, the shanks being resiliently biased to urge the hooks outwardly from the member, resilient means between the member and body maintaining the two in a predetermined relation, and means for maintaining the shanks flexed toward and in coupling relation with the member, the said member, body and resilient means being so constructed and arranged that upon application of opposing pulls to the body and member the resilient means will be tensioned and will yield for movement of the shank maintaining means to release the shanks.

JOHN HELFENSTEIN.